United States Patent
Reisner

(10) Patent No.: US 10,009,659 B2
(45) Date of Patent: Jun. 26, 2018

(54) SYSTEM AND METHOD FOR HYBRID PUSH-BASED STREAMING

(71) Applicant: Disney Enterprises, Inc., Burbank, CA (US)

(72) Inventor: Samuel J. Reisner, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days. days.

(21) Appl. No.: 15/087,022

(22) Filed: Mar. 31, 2016

(65) Prior Publication Data
US 2017/0289639 A1 Oct. 5, 2017

(51) Int. Cl.
| | |
|---|---|
| H04N 21/435 | (2011.01) |
| H04N 21/488 | (2011.01) |
| H04L 29/08 | (2006.01) |
| H04N 21/845 | (2011.01) |
| H04N 21/81 | (2011.01) |
| H04N 21/2385 | (2011.01) |
| H04N 21/262 | (2011.01) |
| H04N 21/235 | (2011.01) |
| H04N 21/239 | (2011.01) |
| H04N 21/61 | (2011.01) |

(52) U.S. Cl.
CPC ......... *H04N 21/4882* (2013.01); *H04L 67/02* (2013.01); *H04N 21/2353* (2013.01); *H04N 21/2385* (2013.01); *H04N 21/2393* (2013.01); *H04N 21/26258* (2013.01); *H04N 21/4351* (2013.01); *H04N 21/6125* (2013.01); *H04N 21/812* (2013.01); *H04N 21/8126* (2013.01); *H04N 21/8455* (2013.01); *H04N 21/8456* (2013.01)

(58) Field of Classification Search
CPC combination set(s) only.
See application file for complete search history.

(56) References Cited

U.S. PATENT DOCUMENTS 9,066,138 B1 * 6/2015 Kraiman ............. H04N 21/458
9,197,944 B2 11/2015 Reisner
(Continued)

OTHER PUBLICATIONS http://tools.ietf.org/html/draft-pantos-http-live-streaming-18, dated Nov. 19, 2015, 98 pages.
(Continued)

*Primary Examiner* — Pankaj Kumar
*Assistant Examiner* — Alexander Boyd
(74) *Attorney, Agent, or Firm* — McCormick, Paulding & Huber LLP

(57) ABSTRACT

Methods and systems for hybrid push-based media streaming of encoded video (or media) content grouped into video segment (or chunk) files to one or more user devices are described, where push notices are provided from a manifest server to subscribing user devices over a persistent low bandwidth connection when the video segment files are ready to be viewed. The video segment files may be downloaded by the user devices from segment servers to the user devices via a separate HTTP high bandwidth streaming connection, or other form of separate connection. In addition, unique, personalized, or additional content may be inserted in the push notices and viewed by the user devices without impacting video playback performance.

35 Claims, 11 Drawing Sheets

(56) References Cited

U.S. PATENT DOCUMENTS

| | | | |
|---|---|---|---|
| 2010/0109868 A1* | 5/2010 | Berger | H04L 67/26 340/540 |
| 2010/0229157 A1* | 9/2010 | Ergan | G06F 11/0748 717/128 |
| 2011/0173681 A1* | 7/2011 | Qureshi | H04W 4/06 709/203 |
| 2011/0307581 A1* | 12/2011 | Furbeck | H04L 67/02 709/219 |
| 2012/0207088 A1* | 8/2012 | Liu | H04L 67/02 370/328 |
| 2015/0181286 A1* | 6/2015 | Gonzalez | H04N 21/25875 725/28 |
| 2015/0365450 A1* | 12/2015 | Gaunt | H04N 21/26258 709/231 |
| 2016/0366195 A1* | 12/2016 | Pattekar | H04L 65/1086 |
| 2017/0078348 A1* | 3/2017 | McGinnity | H04N 21/2385 |

OTHER PUBLICATIONS http://dashif.org/guidelines/ "Dash Industry Forum Guidelines", 3 pages.

http://binaryjs.com "Realtime binary streaming for the web using websockets", 4 pages.

\* cited by examiner

SYSTEM AND METHOD FOR HYBRID PUSH-BASED STREAMING

BACKGROUND

It is common practice for computer-based servers to digitally stream media content (e.g., video, music, text, graphics, and the like), live or on-demand, to electronic devices, such as mobile smartphones, tablets and the like, for viewing by a user. Such media content is often provided to the user devices (or clients) via the internet using a distributed network of computer-based data file servers deployed in one or more data centers, also referred to as a content delivery network or content distribution network (collectively, CDN). A typical CDN structure may be a hierarchical tree format, where if a client requests digital media content or asset from a nearby edge node and that node does not have the asset, it goes to its parent node and the like, until it finds the desired asset. Once a client has requested an asset from a node, the asset remains available for some period of time at that node for future clients, thereby providing an efficient file delivery web architecture.

HTTP-based streaming methods, such as HLS (HTTP-based Live Media Streaming communication protocol), supported or implemented by products made by companies such as Apple, Inc., HDS (HTTP Dynamic Streaming), supported or implemented by products made by companies such as Adobe, Inc., and DASH (Dynamic Adaptive bit-rate Streaming over HTTP) or MPEG-DASH, are commonly used for streaming media content and operate using "HTTP-based streaming," where media content is stored in segments or "chunks" of a predetermined length (e.g., 1 to 10 seconds) and a playlist (or manifest or index) file is provided that lists, or points to, each of the segments or chunks of the media stream for display or playback purposes by the user devices. Such HTTP-based streaming methods are highly scalable to permit high traffic (i.e., many clients requesting video), which helps bring content out to the edge of the network and makes efficient use of the CDNs, and CDN service providers, such as Akamai, Level3, and the like. More detailed information regarding HTTP-based streaming can be found at: Pantos, HLS Draft Specification: tools.ietf.org; DASH Industry Forum: dashif.org; and Binary data over websocket: binaryjs.com, the contents of which are incorporated by reference to the extent needed to understand the present disclosure to the extent permitted by applicable law.

However, such HTTP-based streaming methods suffer from significant network overhead as well as high latency for a given client/user and variable latency from encode to display among different clients/users. In particular, in an HTTP-based streaming environment, clients (e.g., smartphones, tablets, and the like) must repeatedly poll, or sample the status of, the server for new available media content and reload the playlist/manifest file that lists the segments of the media stream that are available for viewing by the user. Each time a client requests a new manifest file from the server, it opens a "socket" connection, negotiates a handshake, exchanges header information, and receives the manifest file, which requires significant network overhead.

In addition to network overhead associated with the repeated polling, such HTTP-based method also introduces more latency for a given client and a wide variation of latencies between different clients. More specifically, if a client requests and loads the manifest immediately after the manifest is updated with a new segment file, the client will experience minimum latency. If a client requests and loads the manifest just prior to it being updated with a new segment file, the client will experience maximum latency. Thus, on average, the additional latency for a given client is about one-half of the segment file duration, thereby causing the client's viewing experience to be delayed. In addition, because different clients request and load updated manifests at different times, the latency is not consistent from one client to the next, thereby creating a different viewing experience for different clients.

For example, if two users (or clients) are sitting next to each other viewing the same sporting event (from the same video stream) on their respective smartphones, one user may see that a team has scored before another user. This can create a less than optimal viewing experience for the users.

Another streaming approach is "push-based" streaming, such as RTSP (Real Time Streaming Protocol) or RTMP (Real Time Messaging Protocol, by Adobe). With "push-based" streaming methods, a persistent (or continuous) connection between a server and a client is created (or opened) and the video data is "pushed" from the server to the client on a continuous basis. In that case, streaming video is typically accomplished by opening a "socket" connection and pushing video data down the connection where the client would receive it, decode it, and display it. Such an approach can reduce latency that would be inherent in an HTTP-based polling approach discussed above; however, it requires a significant dedicated infrastructure in a content delivery network (CDN) because a given server can only handle a certain number of client connections at one time, and thus does not scale well to permit high traffic.

Accordingly, it would be desirable to have a system or method that improves the short-comings of existing video streaming techniques and that enables improved performance of digital streaming to provide a better viewing experience for the user.

DETAILED DESCRIPTION

As discussed in more detail below, the present disclosure is directed to methods and systems for improving HTTP-based media streaming by alerting or notifying clients/user devices when video segments are ready to be viewed while reducing the overhead associated with HTTP-based video streaming. In particular, it allows multiple user devices that are viewing the same video stream to have the same viewing experience. The present disclosure also allows a viewer to switch from one viewing device to another without missing content or having to re-watch content already seen. By notifying clients/user devices when content becomes available, they are able to synchronize the loading of content, thereby reducing the variation in playhead position among devices during a live stream. In addition, by allowing clients/user devices to begin playing immediately after a fresh segment is available, viewers can receive the most up-to-date content possible.

It also provides the ability to insert personalized client-specific content, e.g., commercials or other targeted or non-targeted content, during commercial or other breaks in the original program content/video, for one or more user devices. It further provides the ability to insert auxiliary or additional content on the screen with the original video, for one or more user devices. It further provides the ability to track individual usage of user devices to identify, e.g., pause and transport control activities.

Figure 1:
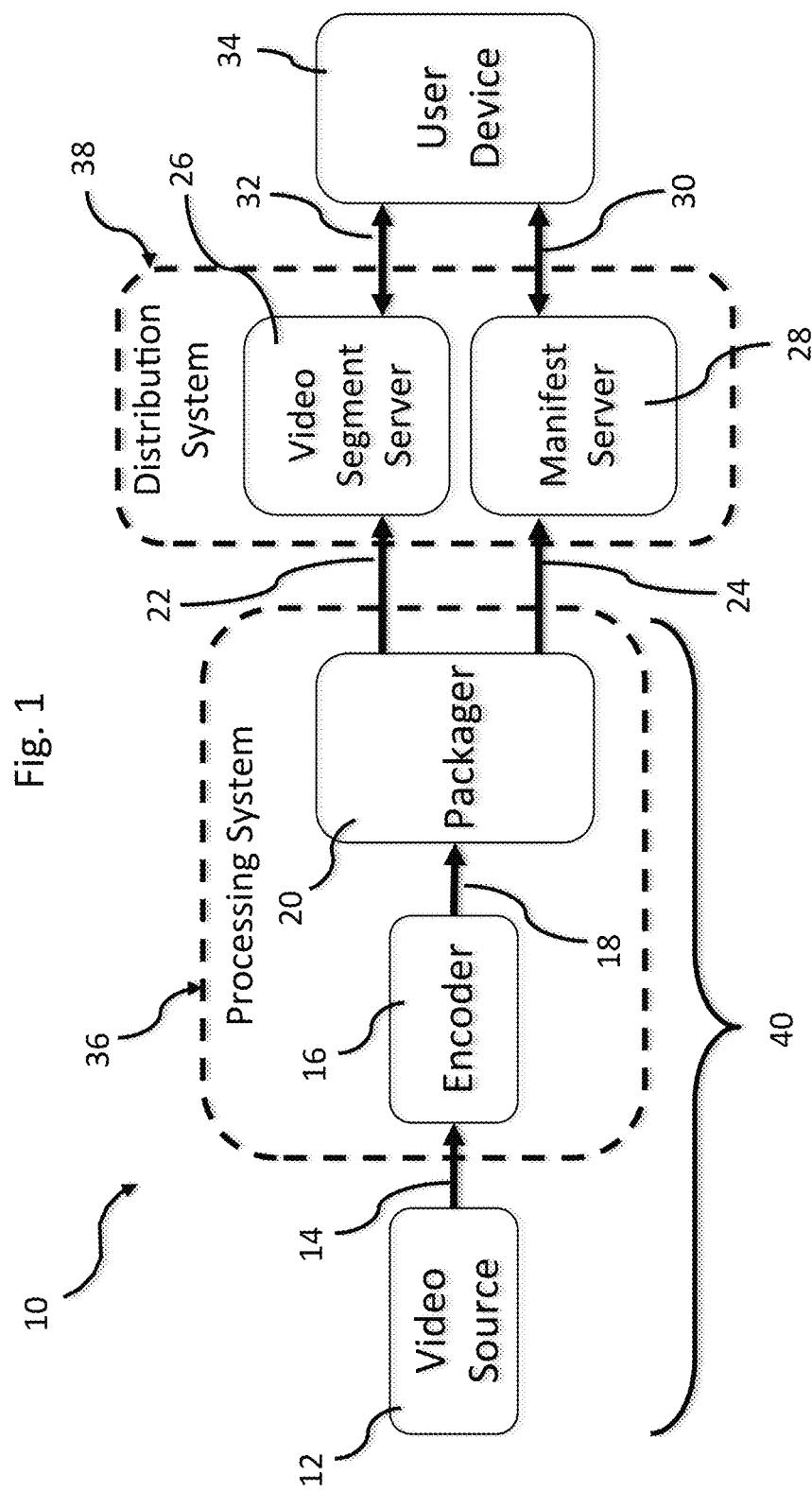
FIG. 1 is a block diagram of components of a digital media streaming system, in accordance with embodiments of the present disclosure.
Figure 2:
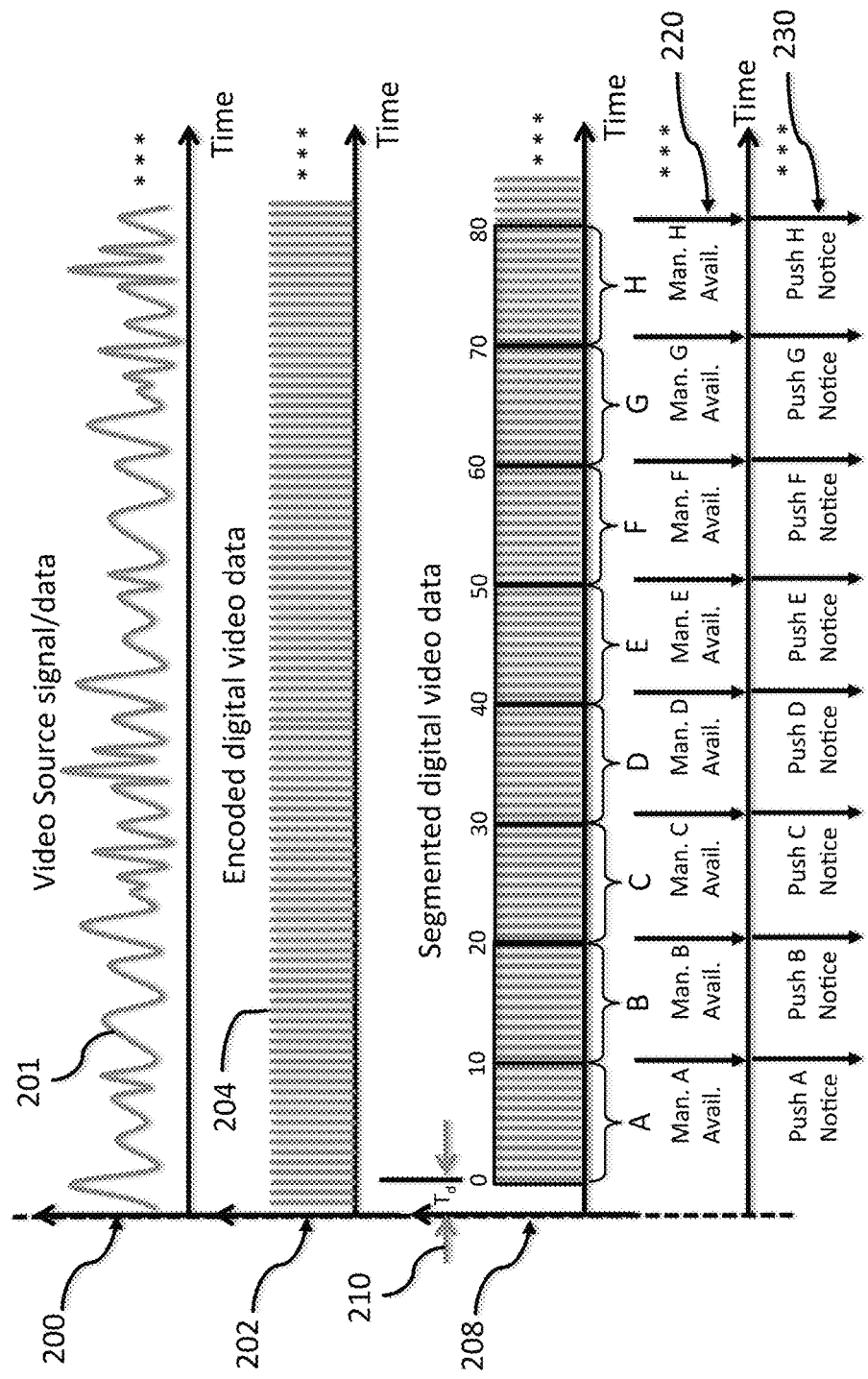
FIG. 2 is a series of graphs showing generalized data formats and timing, in accordance with embodiments of the present disclosure.

FIG. 1 illustrates various components (or devices or logic) of a client-server based digital media streaming system 10, which includes a video source 12, which provides source video (or other media) data or signal for distribution to one or more client devices 34 as discussed herein. The video source 12 may include, for example, one or more video cameras, video players, production or master control centers/rooms, playback servers, video routers and the like. Although a single video source 12 is shown, a plurality of different video sources may be used if desired in some embodiments of the present disclosure. The video stream signal or data provided by the video source 12 may be an analog signal, such as that shown by a line 201 on a graph 200 (FIG. 2).

The video stream data 200 from the video source 12 (FIG. 1) is provided on a line 14 to an encoder 16, which converts the video stream source signal 201 to a digitized or encoded digital stream of data indicative of the video source signal 201. An example of the encoded video signal is shown on a graph 202 (FIG. 2), where each vertical line 204 represents a digital word sample indicative of the value of the video source signal 200, and the time spacing between the lines 204 is indicative of the rate at which the encoder samples the source signal (encoder sample rate) to convert it into digital words. The number of digital bits in each digital word sample may be indicative of the resolution of sample of the video source signal. The encoder 16 may be any encoder that receives a real-time or other input signal from one or more audio-video devices and encodes the stream and formats it for delivery. The encoder 16 may provide one or more versions of the encoded digital video data, if desired, e.g., a given input stream may produce a plurality of different sample rates, resolutions, qualities, or variants, of the digital video data stream, which may permit "adaptive bit rate" streaming, discussed more hereinafter.

The encoder 16 provides the encoded digital data stream 204 (FIG. 2) on a line 18 to a packager (or segmenter or chunker) 20, which reads the encoded digital data stream 204 (FIG. 2) and divides (or packages) it into a series of smaller segments or "chunks" of video data, each having substantially equal duration (e.g., 1 to 10 seconds each), and provides the video segments on a line 22 (FIG. 1) as video files to a video (or media) segment (or chunk) server 26, where they are stored for use by the client/user devices 34. The segment server 26 may be a plurality or network of servers or a CDN, as discussed herein, wherein one or more servers may be referred to as an "origin" server. The video data segments or chunks are illustrated as letters A-H on a graph 208 in FIG. 2, each of which may be a separate data file A-H. There is also a small time delay Td (FIG. 2), e.g., 500 milliseconds, between the beginning of the encoded digital video data 204 and the beginning of the first segment (or chunk) video data file A, due to processing time of the packager 20 (FIG. 1) and transfer time of the network to transfer the video segment data file to the video segment server 26.

After a given video segment (or chunk) file A-H (FIG. 2) has been stored on the video segment (or chunk) server 26 (FIG. 1), the packager 20 provides a manifest or playlist or index file (or updated version of same) on a line 24 to a manifest server 28, which includes the pointer, or location, or address, such as a URL (universal resource locator) or URI (universal resource indicator) or other network or server location identifier, and characteristics or metadata about the video segment file, e.g., file name, resolution, segment length/duration, segment sequence number, serial number, size, bit rate, sample rate, bandwidth, quality, digital rights management controls, sample rate, time stamp, and the like, of the associated video segment file (discussed more herein). In addition, after the manifest file is updated on the manifest server 28, it is available for reading by the client/user device, as indicated by the lines 220 in FIG. 2. Also, the manifest server 28 may notify or alert the client/user devices 34, e.g., via a "Push Notice", or push notification, of the availability of the new segment (or next segment), as shown by the lines 230 in FIG. 2. The Push Notice may be any form of notice (or alert or interrupt) that alerts the user device 34 that a new (or next) video segment is available for viewing. The manifest server 28 may also be referred to as the "Push Server" when it provides or sends the Push Notice. Alternatively, the packager 20 or other logic, servers, or components in the processing system 36 or other logic, servers or components in the distribution system 38, or a combination thereof, may send the Push Notice 230 to the user devices 34.

Figure 3:
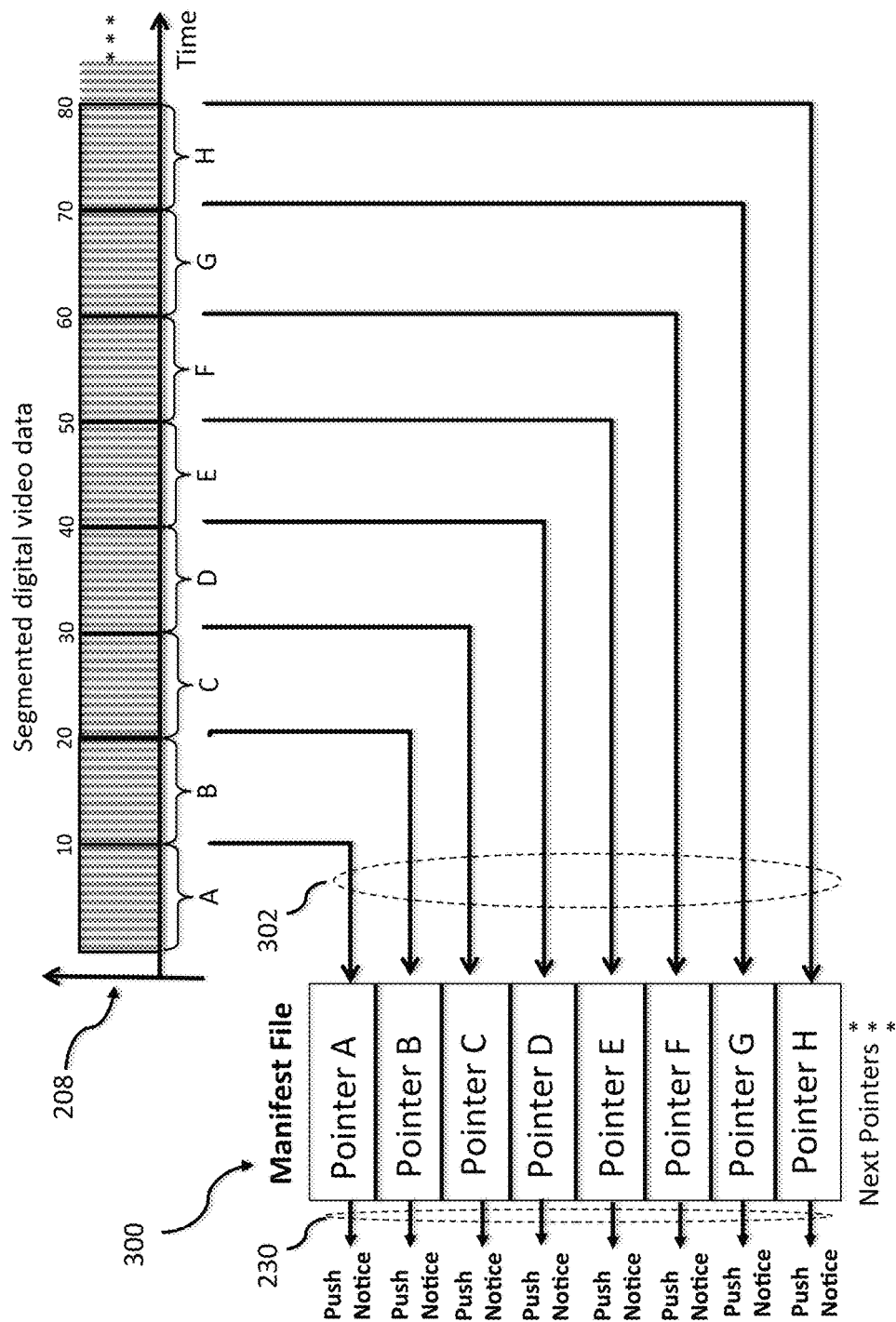
FIG. 3 is a graph showing generalized data formats for segmented video data, timing, a sample manifest file, and push notices, in accordance with embodiments of the present disclosure.

Referring to FIG. 3, a manifest file 300, or "source" manifest file (on the manifest server 28) is shown in conjunction with the timing from the timeline graph 208 showing when the video segment/chunk files are written to (or stored or saved on) the video segment server 26 (FIG. 1). After each new video segment (or chunk) file A-H is packaged and stored on the video segment server, the manifest file 300 (FIG. 3) on the manifest server is updated with a new pointer (Pointer A-Pointer H) which points to the location of new (or newest or next) segment file in the segment server 26 (FIG. 1), as shown by the lines 302 (FIG. 3). Once a given pointer, e.g., Pointer A to Pointer H, is written to the manifest file 300, the push notice 230 is provided to the client device 34, as indicated by the Push Notice lines 230 (also shown in FIG. 2). The source manifest file 300 is continually updated on the manifest server 28 as the video source data 200 (FIG. 2) is received and processed by the encoder 16 and packager 20 (FIG. 1). Also, the manifest file 300 may be a rolling or shifting file (or stack) of fixed size, e.g., 20 video links or pointers, such that when a new pointer comes in at one end of the stack (e.g., bottom end), the oldest pointer is removed from the other end (e.g., top end).

The manifest file 300 (FIG. 3) may have any digital format and specify any information needed to provide the functions described herein. For example, the manifest file 300 may include information identifying the video segment (or chunk) file location (e.g., which may be in a format such as http://url/segment_filename), as well as information or metadata identifying the segment length/duration, time stamp, the segment or media file sequence number or serial number, the size, the bit rate, sample rate, the bandwidth, the resolution (e.g., 320×180, 480×272, 576×324, 640×360, 768×432, 960×540, 1280×720, and the like), whether it is an audio or video file, and information specifying any encryption or other special formatting or processing required to play the segment. The manifest file 300 may also specify any digital rights management controls associated with the segment or stream. In some embodiments, each of the manifest files may be provided in a known format, such as text file (e.g., .m3u8 or the like) for HLS streaming, XML-based text file for DASH streaming (e.g., f4m XML file or the like) for HDS, or other file types. Also, for "adaptive bit rate" streaming, there may be a "top-level" or "master" manifest that points to one or more different manifests each manifest associated with a different resolution for a given video segment, which enables user devices to use more or less bandwidth/resolution based on certain conditions, e.g., speed of the network, at any give time for any given video segment. In that case, the client user device 34 (FIG. 1) may obtain the updated manifest pointer or link for the video resolution it needs at a given time, or it may obtain the "top-level" manifest pointers/links and the lower level manifest pointers for all the available resolutions as part of the push notice. In the later case, such a push notice enables the client 34 to switch bit rates much faster as the manifest's information already resides on the client device 34. This is feasible with the current disclosure as the amount of information transferred for the manifest is small and thus does not take up much overhead (as discussed herein).

Each of the individual video segment files A-H (FIGS. 2-3) produced by the packager 20 (FIG. 1) may be generated in any desired compatible format, such as MP4 file format for HLS; however any other format may be used if desired. In the case where the media files being streamed are audio-only files, suitable audio formats may be used, such as AAC audio or MP3 audio formats, or other formats.

Referring again to FIG. 1, the encoder 16 and the packager 20 may be viewed as part of a computer-based processing system 36 that processes input video data from one or more video sources 12 and provides a digitized segmented series of video segment files A-H (FIG. 2) indicative of the input video data, to the video segment server 26, and also provides the manifest file 300 (FIG. 3) indicative of the location and characteristics (or metadata) of the video segment files A-H to the manifest server 28. In addition, the order of the encoder 16 and packager 20 in the processing system 36 may be reversed if desired. In that case, the video signal from the source 12 may be packaged/segmented first, and then encoded. Alternatively, the encoder 16 and packager 20 may be performed using a single component, device or logic. Also, the encoder 16, packager 20 (or both) may reside inside the video camera or video source 12 itself.

Also, the video segment server 26 and manifest server 28, may be viewed as a distribution system 38, which distributes the manifest files 300 (FIG. 3) and video segment files A-H (FIGS. 2-3) to one or more of the client/user devices 34 (FIG. 1). In particular, the distribution system 38 may include one or more standard web servers for delivering data streams and other files to the client devices. The distribution system 38 may be or include a content delivery network, an edge network, or the like. The video segment server 26 and the manifest server 28 may be part of the same file server, and may be referred to herein collectively as "media" servers. Also, the media source 12, the processing system 36 and the distribution/server system 38 may be referred to herein collectively as a "media system."

The client devices 34 may be any of a number of computing devices capable of receiving and displaying media information distributed by the distribution system 38 over the HTTP connections. For example, the client device 34 may include desktop computers, mobile smartphones, tablet computers, laptop computers, set top boxes, tablet computers, Internet-connected (or smart) televisions, or the like. Each of the client devices 34 operates client application software, such as a Web Browser or the like, to access and obtain data provided by the distribution system 38, such as, for example, manifest files based on a URL or pointer identifying a desired stream of media.

The client device 34 uses information in the manifest file to identify the location of a series of media files in a stream. The client device 34 downloads each media file (or "chunk" or segment) in sequence. Once the client/user device 34 has obtained a sufficient amount of downloaded data, the client device 34 presents or displays the sequence of media files to the user of the client device 34. The client device 34 obtains the manifest files from the manifest server in the distribution system 38, discussed more hereinafter.

Figure 4:
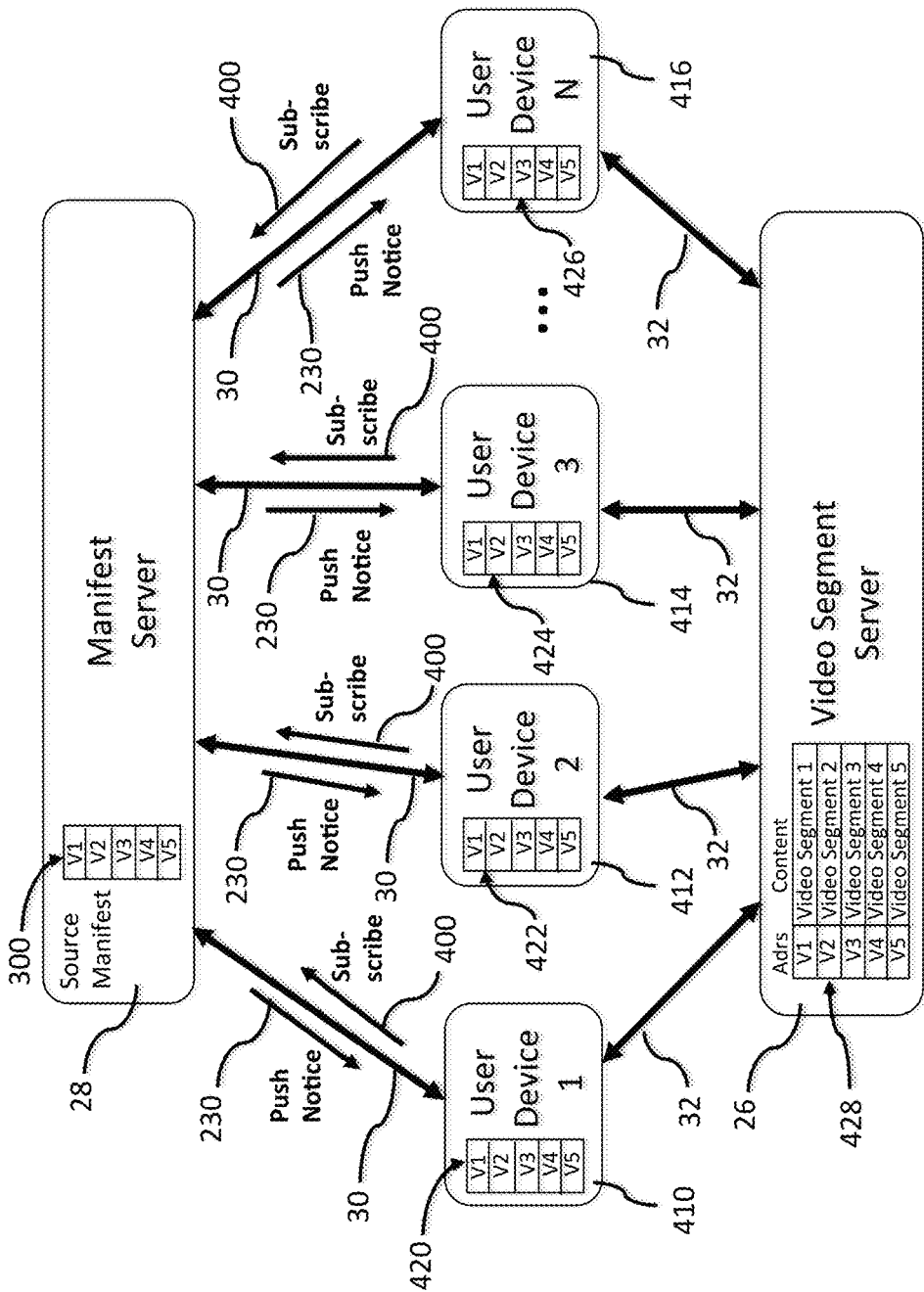
FIG. 4 is a block diagram showing communications between multiple user devices and a manifest server and a video server, in accordance with embodiments of the present disclosure.

Referring to FIG. 4, as discussed above, the client/user devices 34 (FIG. 1), shown as devices 410-416 in FIG. 4, communicate with the manifest server 28 and the video segment server 26 to obtain the manifest file 300 (FIG. 3), or updates therefrom, and the video content segment files. When one or more of the user devices 410-416 desires to stream video, the respective user device 410-416 may send a client "subscription request" (or "push notice request") message 400 on the line 30 to the manifest server 28 to open a low-bandwidth "persistent connection" with the manifest server 28. The device 410-416 may also send an optional "video streaming request" message prior to and separate from the client subscription request, if desired, to indicate it desires to stream video. In response to the client subscription request, the manifest server 28 adds the respective client to the subscriber list and opens the persistent connection with the manifest server 28. More specifically, a "stateful" persistent connection, such as "websockets", HTTP long polling, plain TCP sockets, or any other push-based technology persistent connection capable of performing the functions described herein, is created between the associated client/user devices 410-416 and the manifest server 28, and every time the manifest server 28 has an updated manifest pointer (and metadata), the manifest server 28 sends it (or broadcasts it) simultaneously to all the client/user devices 410-416 that have subscribed to the persistent connection, as shown on the line 230 as the Push Notice (also shown in FIGS. 2 and 3). The push notice 230 is a very small text file which is an extremely low-bandwidth-consuming communication containing a small amount of text, e.g., typically a few lines of text up to a maximum of a few hundred lines of text (for very long video stream with a large window). Accordingly, it does not require much network server or device overhead to manage the connection.

In addition to or as part of the subscription request, or creating the persistent connection, the user device 34 may provide identifying data/information about the device or the user, such as name, location, profile, demographics, age, preferences, context, or other information that may identify the individual user or a category or type or general characteristics of user or the user's likes/dislikes, e.g., sports fan, baseball fan, likes scrolling scores on bottom of screen, likes updates or alerts, and other similar characteristics. Such data may be used for selecting or directing additional content/data or personalized content or data to the user devices 34, as discuss more hereinafter. Also, the persistent connection may be used by the manifest server 28 to monitor or track individual usage activities by the subscribing user devices 410-416, such as pause commands, transport control commands (e.g. moving from one device to another), and the like.

Thus, when a new video segment file is available for viewing and the source manifest file 300 has been updated in the manifest server 28, shown as having pointers V1-V5, the manifest server 28 automatically provides (or pushes) the updated (or changed) manifest pointer (and any associated metadata) simultaneously to all the corresponding clients/user devices 410-416 that have created the persistent connection. Each of the client user devices 410-416 may create its own local manifest file 420-426, respectively, each file 420-426 having its own corresponding manifest pointers V1-V5, which is populated via the push notice with the newest or next pointers from the manifest server 28 for the next video segment when it becomes available. For example, an updated manifest pointer (and metadata) may be loaded (or pushed) into the local manifest files 420-426 (buffer, queue or stack) in the subscribed client/user devices 410-416. In this configuration, only the changes or updates to the pointers V1-V5 in the source manifest file 300 are sent to the subscribing client/user devices 410-416 for display by the devices 410-416, not the entire manifest file 300. The client/user device 410-416 may request an initial HTTP download of the full manifest file 300 from the manifest server to obtain the initial pointers and metadata (and the manifest server information) and then update the manifest as it receives updated pointers, or it can open the persistent connection without an initial copy of the manifest file and build the manifest file from the updates received from the manifest server push notices. The persistent connection between the user device and the manifest server may also be referred to herein as a "manifest connection."

In some embodiments, instead of a single local manifest file or buffer 420-426 in the user devices 410-416, there may be a multiple buffers, such as fetching buffer (which receives the push notice) and a playback buffer (which is the buffer of content to be played on the device) in the client devices, all are collectively referred to as the local manifest files 420-426 herein. Other configurations for the local manifest may be used in the user devices 410-416, if desired.

Also, instead of the push notice 230 having the pointer to the new (or next) video segment file, the push notice 230 sent to the user devices 410-416 may be simply an alert or interrupt or other notification that informs the user devices 410-416 that a new (or next) video segment is available for viewing, e.g., a segment alert. In that case, when the user devices 410-416 receive the push notice 230, the user device may request the pointer (or the manifest file or a portion thereof) from the manifest server 28 over the low bandwidth persistent connection, to obtain the pointers to the desired video segment(s), at a time determined by the user devices 410-416. Also, in some embodiments, the manifest server 28 may send one format of push notice 230 (e.g., with location pointer or metadata) to certain user devices and another format (e.g., alert only) to other user devices, or may change or update the Push Notice 230 format sent to some or all subscribed user devices based on requests, requirements, or performance criteria, of the user devices, servers, or networks, or based on other reasons.

Also, when a new segment or chunk file is available for downloading, the user devices 410-416 may obtain the segment or chunk video files, shown by a table 428 with address pointers V1-V5 corresponding to video segments Video Segment 1-Video Segment 5, from the video segment server 26 on the lines 32, using the standard media HTTP-based caching and distribution. The user device 410-416 may download the segment file having the desired quality, resolution or variant that is needed or capable of being viewed for that segment, in view of various performance factors, such as network speed and the like. While the type of connection between the user device and the segment server for downloading the video segment may be a non-persistent high-bandwidth HTTP-based connection, any other desired connection may be used that provides the device with the desired video having the desired performance criteria, such as a persistent connection, a low bandwidth connection, or other connections now known or later developed. Also, the video segments may be downloaded from the segment server 26 using standard protocols/handshakes based on the connection used, including any requests for access and downloads. The connection between the user devices 410-416 and the segment server 26 for downloading the video segments to the user devices 410-416 may also be referred to herein as a "segment delivery connection" or "segment connection."

Figure 5:
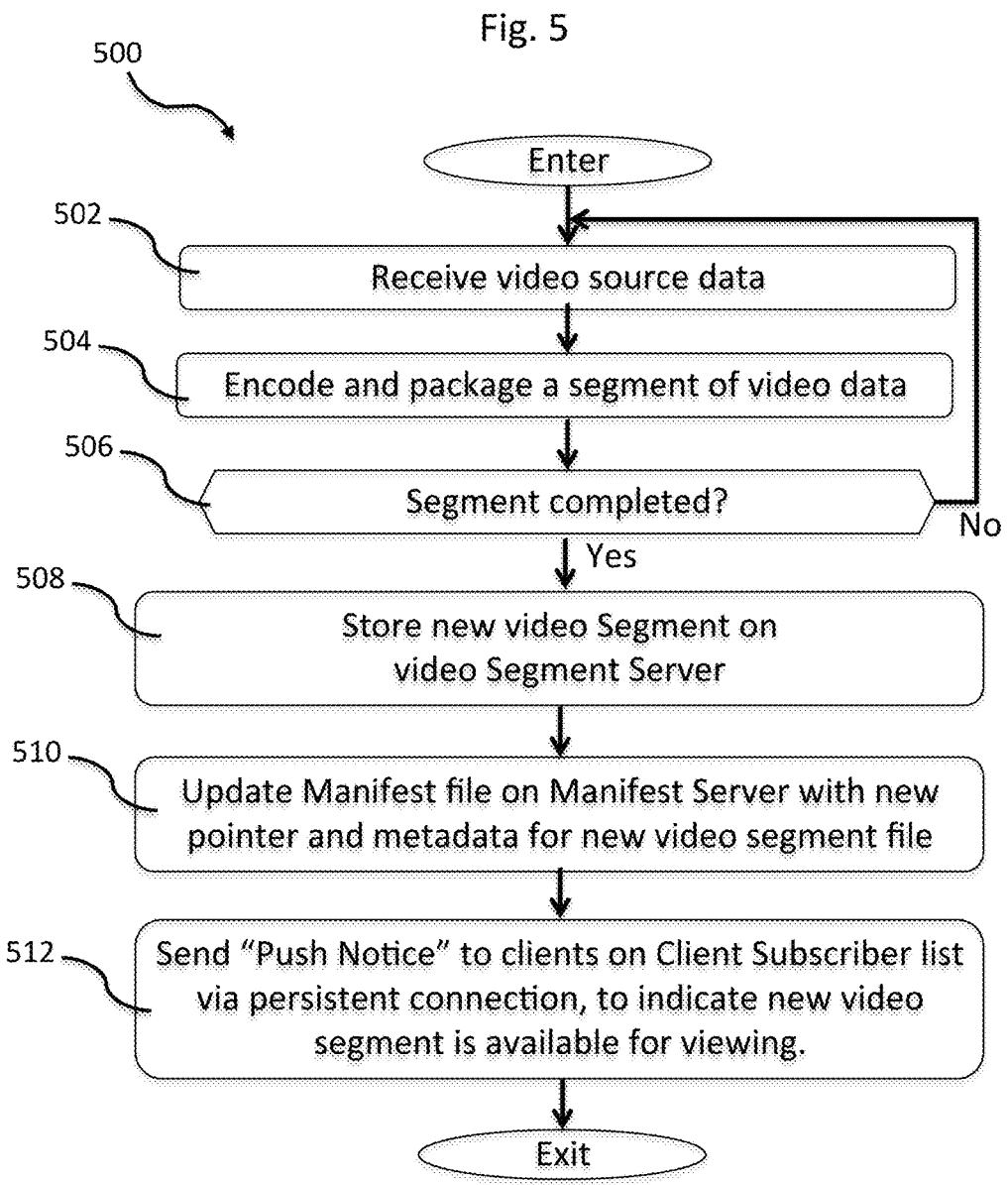
FIG. 5 is a flow diagram for encoding, packaging/segmenting, and storing video data, updating manifest files, and providing push notices to clients, in accordance with embodiments of the present disclosure.

Referring to FIG. 5, a flow diagram 500 illustrates one embodiment of a process or logic for implementing encoding, packaging/segmenting, and storing video data and updating manifest files and providing push notices to clients/users devices, which may be implemented by the processing and distribution systems 36,38 (FIG. 1). The process 500 begins at block 502, which receives video source data from the video source 12 (FIG. 1). Next, a block 504 encodes and segments/chunks/packages the video signal for the latest video data received. Next, a block 506 determines whether an encoded segmented/chunk is completed. If NO, the block 502 receives more video source data to complete the encoding and packaging portion of the process 500. If the result of block 506 is YES, block 508 stores the new video segment/chunk file on the video Segment Server 26 (FIG. 1). Next, block 510 updates the manifest file on the manifest server 28 (FIG. 1) with new pointer and metadata information for the new video segment file. Next, block 512 sends the "Push Notice" 230 (FIGS. 2-4) to clients/user devices on the Client Subscription list via the persistent (manifest) connection to indicate that a new video segment is available for viewing, as discussed above, and the process exits. As discussed herein, the Push Notice 230 may have the new pointer and metadata information or may simply be an alert, notification or interrupt (without the pointer/metadata).

Figure 6:
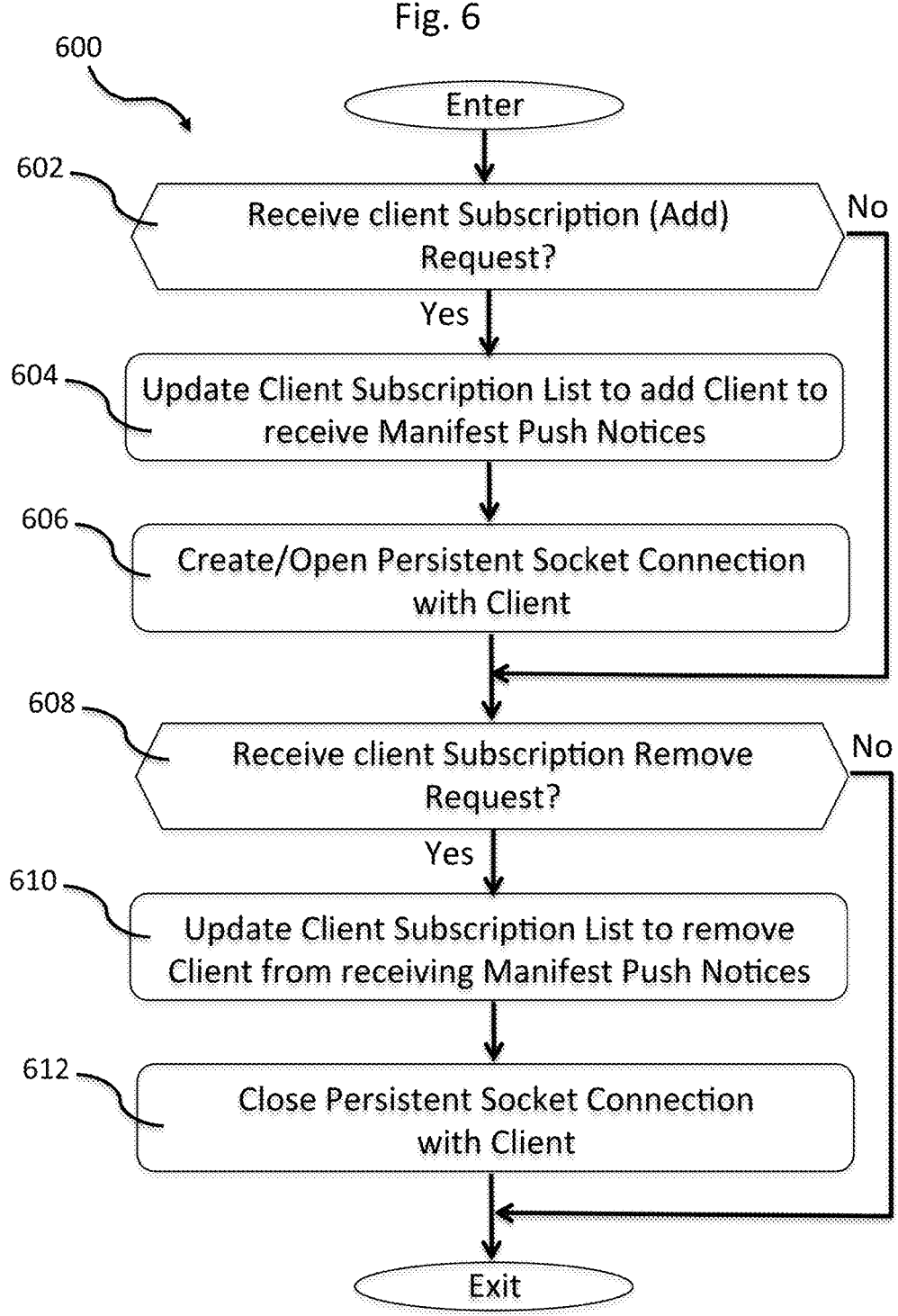
FIG. 6 is a flow diagram for receiving and managing client subscription requests for push notices from a manifest server, in accordance with embodiments of the present disclosure.

Referring to FIG. 6, a flow diagram 600 illustrates one embodiment of a process or logic for implementing receiving and managing client subscription requests for push notices from the server, which may be implemented by the distribution system 38 (FIG. 1). As discussed above, when one or more of the user devices 410-416 (FIG. 4) desires to stream video, the respective user device 410-416 may send a client subscription request message 400 to the manifest server 28 to open a "persistent connection" with the manifest server 28. In particular, the process 600 begins at block 602, which determines whether a client subscription add request has been received from a client/user device 34 (FIG. 1). If YES, block 604 updates the client subscription list to add the requesting client to receive manifest Push Notices. Next, a box 608 creates or opens a persistent socket connection (discussed above) with the client/user device that made the request. After performing block 608, or if the result of block 602 is NO, block 610 determines whether a client subscription remove request has been received from a client/user device 34 (FIG. 1). If YES, block 612 updates the client subscription list to remove the requesting client from receiving manifest Push Notices. Next, a box 608 closes the persistent socket connection with the client/user device that made the request, and the process exits.

Figure 7:
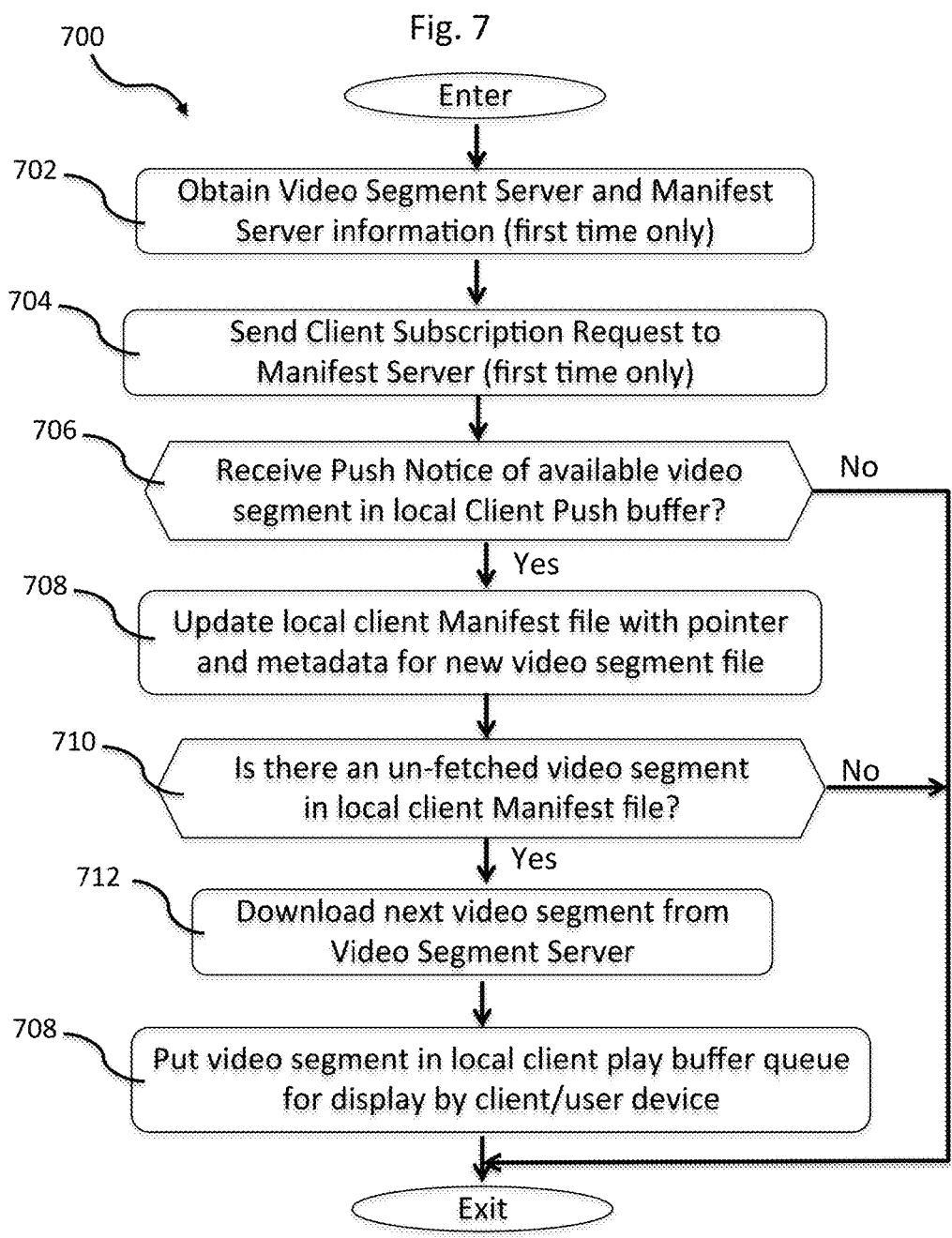
FIG. 7 is a flow diagram for receiving push notices, managing manifest files and obtaining video segments by a client, in accordance with embodiments of the present disclosure.

Referring to FIG. 7, a flow diagram 700 illustrates one embodiment of a process or logic for implementing receiving push notices, managing manifest files and obtaining video segments by a client/user device 34 (FIG. 1). The process 700 begins at block 702, which obtains information about the video server 26 and manifest server 28 for the client/user 34 to interact with the servers 26,28 or the distribution system 38 generally. The process may also, at the block 702, obtain an initial version of the manifest file, if desired. Next, a block 704 sends a subscription request to the manifest server 28, or any other server (or push server) that will provide Push Notices described herein to the user devices. Blocks 702, 704 are only performed the first time through the process. Next, a block 706 determines whether a Push Notice has been received from the manifest server 28. If YES, block 708 updates the local client manifest file with pointer and metadata information for the new segment file. If the Push Notice 230 does not contain the manifest pointer (e.g., is a segment alert only), the block 708 may also request the pointer or manifest file from the manifest server 28 prior to updating the local manifest file. If the result of block 706 is NO, the process exits. After performing block 708, block 710 determines whether there is an un-fetched video segment file in the local client manifest file. If YES, block 712 downloads the next video segment from the segment server 26. If the result of block 710 is NO, there are no un-fetched segments to download, so the process exits. After performing block 712, block 714 puts the video segment file in the client play buffer queue for display by the client/user device 34 (FIG. 1), and the process exits.

Figure 8:
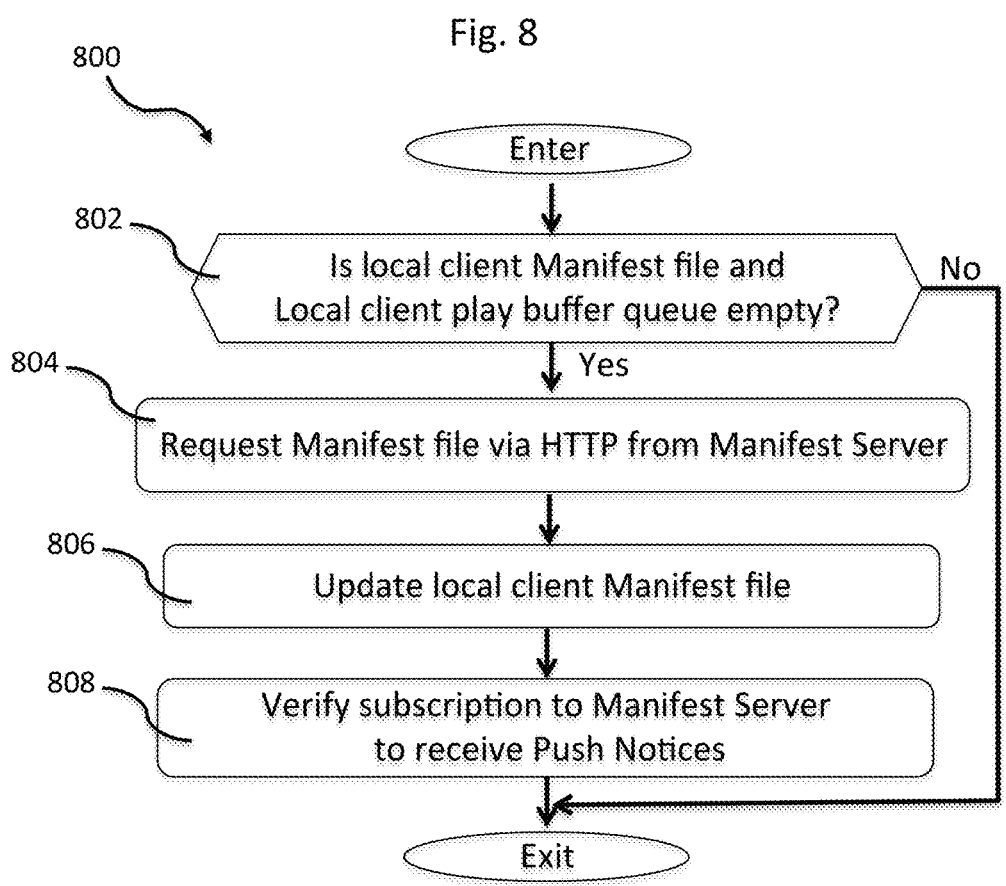
FIG. 8 is a flow diagram for monitoring and managing by a client when a manifest file becomes empty, in accordance with embodiments of the present disclosure.

Referring to FIG. 8, a flow diagram 800 illustrates one embodiment of a process or logic for implementing monitoring and managing by a client/user device 34 (FIG. 1) when the local client manifest file becomes empty. The process 800 begins at block 802, which determines whether the local client manifest file and associated local client play buffer are empty. If YES, the client has run out of video segment files to display to the user, which may have several possible causes. For example, the signal from the manifest or video segment servers 26,28 may have dropped out, causing an interruption in data flow to the client/user device 34. The drop out could be caused by a problem at the client/user device 34, such as power loss or battery loss, or a problem at the distribution system/network 38, such as a network problem, power loss, traffic or bandwidth overload, or the like. Next, block 804 requests the manifest file via an HTTP request from the manifest server 28 to enable the client/user device 34 to recalibrate and determine if there are any segments on the manifest that have not yet been displayed. Next, once the manifest file has been received from the manifest server, block 806 updates the local internal client manifest file. If the result of block 802 is NO, the process exits. After performing block 806, block 808 verifies the subscription to the manifest server to receive Push Notices, and the process exits. Alternatively, block 808 may simply send a new client subscription request to the manifest server 28 to be added to the subscription list for Push Notices (such as that shown in block 704 of FIG. 7).

Figure 9:
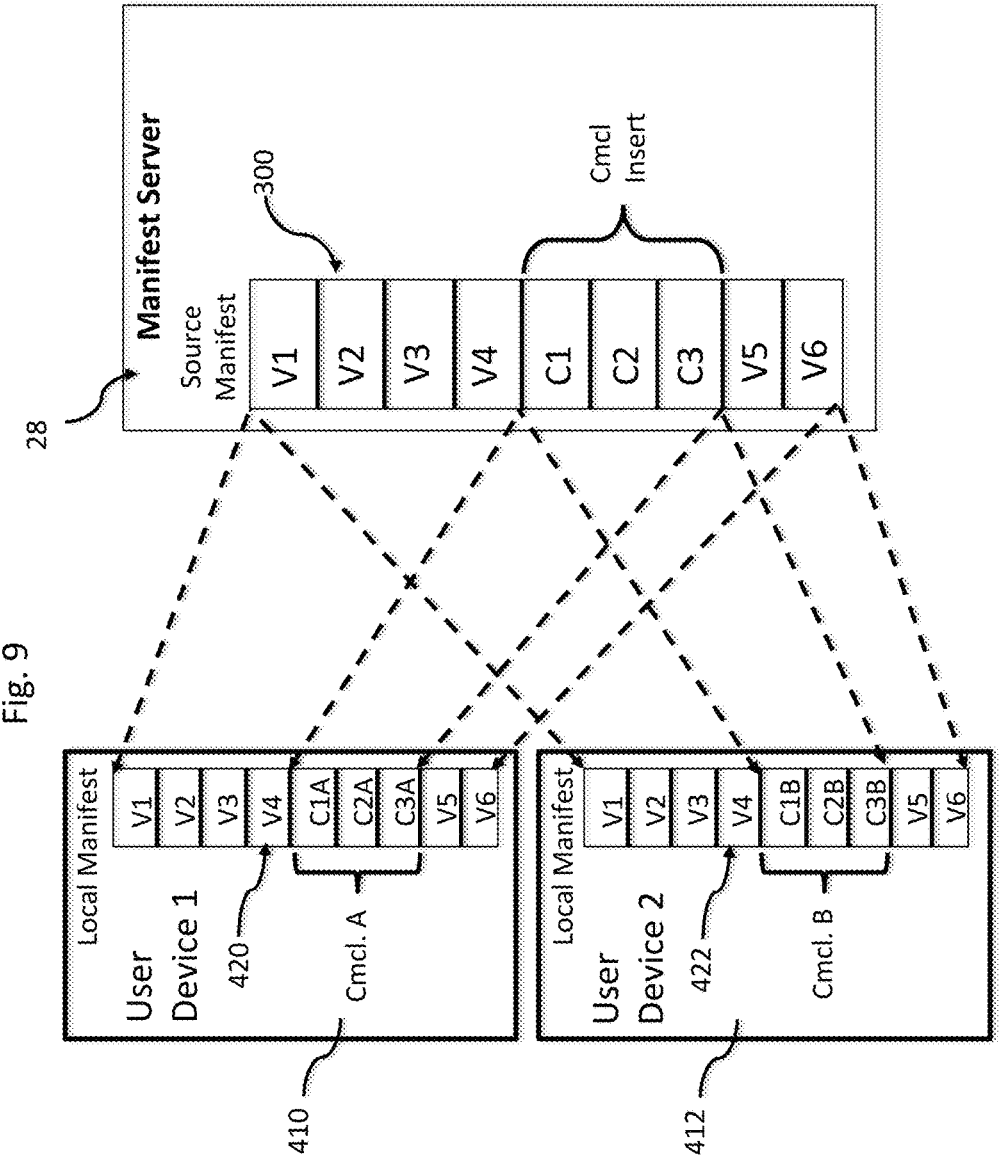
FIG. 9 is a block diagram showing personalized commercial content on local manifest files driven by a manifest file on a manifest server, in accordance with embodiments of the present disclosure.

Referring to FIG. 9, the present disclosure also provides a convenient structure to serve personalized content or data to each client or user device. In particular, when it is time for a commercial break in the original video stream being viewed (e.g., pointers V1-V4, V5-V6) by two user devices 410, 412 that have subscribed to receive Push Notices, the manifest server 28 may insert commercial video segment pointers C1,C2,C3 in blocks into the manifest file 300. The pointers C1-C3 may point to another area of the segment server or to another server (not shown), e.g., a commercial video server, having the desired commercial video content or media to be shown during a commercial break from the original video stream.

As discussed herein, the subscribed user devices 410,412 each create their own local manifest files (or buffers or queues or stacks) 420,422, respectively, from the Push Notice commands received from the manifest server 28, which are used by each of the user devices 410,412 to view video/media content. Because both the devices 420,422 are provided push notices from the manifest server 28 simultaneously, i.e., broadcast or sent to each subscribed device at the same time, the commercial video stream can start and stop playing at the same time, which preserves the consistent viewing experience from one device to the next and from one viewer to the next.

Also, the manifest server may provide in addition to the main program content being viewed, may also provide personalized or additional content or data to the user devices 410-416 (FIG. 4). In particular, referring to FIG. 9, because the manifest server 28 knows the IP address and potentially other identifying information of the user or devices 34 it is providing push notices to (as discussed above), it may be desirable to provide personalized commercials or other personalized content/data to one or more of the user devices 410,412. Such personalized content may be directly related to or not related to the program content. For example, the local manifest 420 for the User Device 1 (410) may receive Commercial A, e.g., new car commercial, shown as a block of pointers C1A,C2A,C3A pointing to that video content, while the local manifest 422 for the User Device 2 (412) may receive Commercial B, e.g., a life insurance commercial, shown as a block of pointers C1B,C2B,C3B pointing to that video content. The specific type of commercial or content that is sent to a given user device 410,412 may be determined by the manifest server 28, which may be controlled by the content provider, or it may be controlled by one or more another servers or computers (not shown), which may send content to the manifest server 28. With this approach, such added content can be easily inserted and remain in synch.

Figure 10:
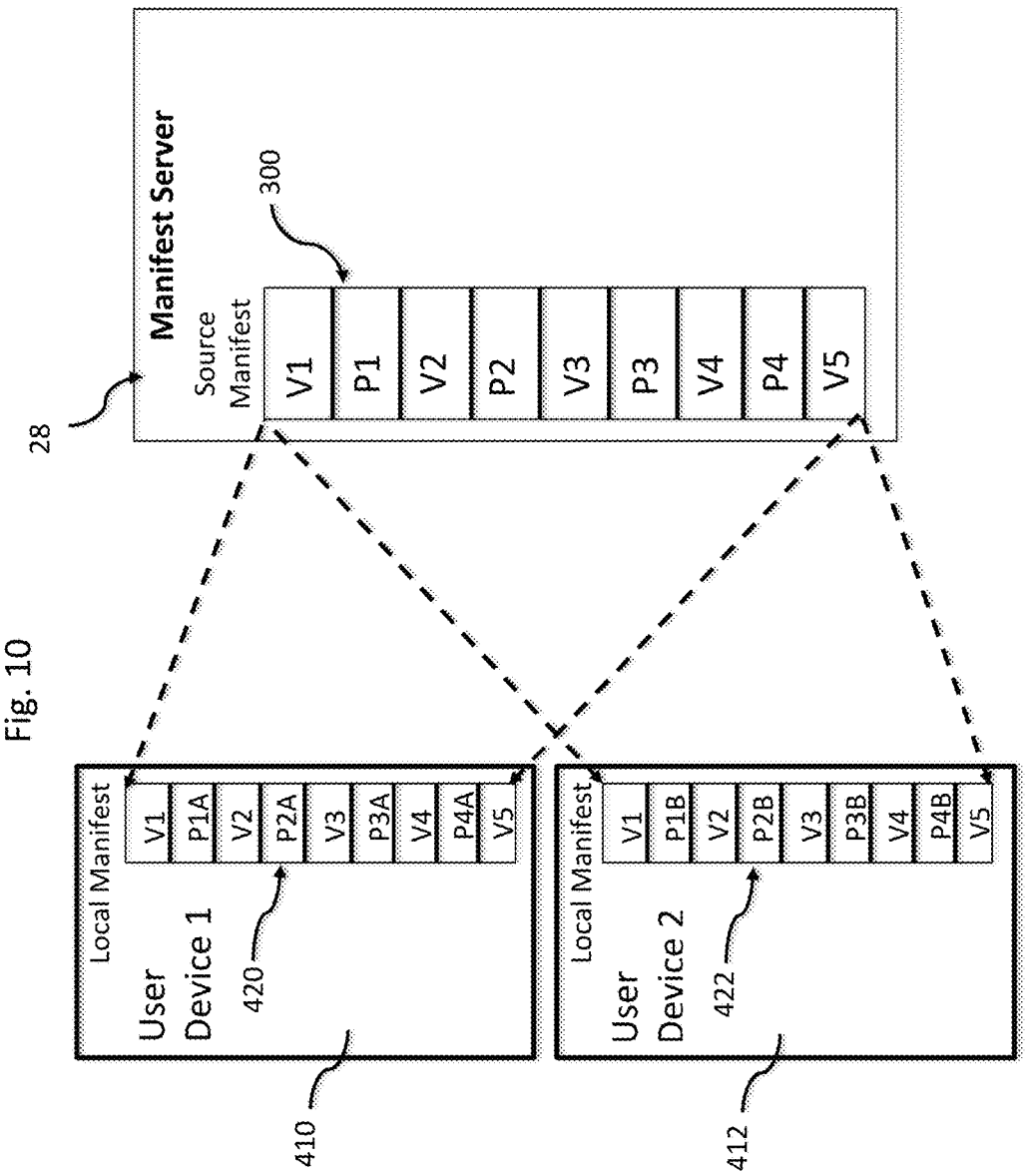
FIG. 10 is a block diagram showing personalized content on local manifest files driven by a manifest file on a manifest server, in accordance with embodiments of the present disclosure.

Referring to FIG. 10, the manifest server 28 may send other types of personalized content to the users 410,412, such as information that is auxiliary to the main screen content, e.g., sports scores, news, updates, scoring events, player or team statistics, breaking news updates, time sensitive data, advertisements, advertising data, alerts, and the like. In that case, content may be inserted in the manifest file 300 in blocks, such as that shown for the commercial video segments C1,C2,C3 (FIG. 9), or it may be integrated or interleaved into the original video stream pointers V1-V5, such as that shown for pointers P1-P4 in FIG. 10.

For example, the local manifest 420 for the User Device 1 (410) may receive Personal Content A, e.g., scrolling sports scores, shown as pointers P1A,P2A,P3A,P4A, pointing to the personalized content for that device, and interleaved between the original video pointers V1-V5 on the local manifest. Similarly, the local manifest 422 for the User Device 2 (412) may receive Personal Content B, e.g., scrolling breaking news, shown as pointers P1B,P2B,P3B, P4B, pointing to the personalized content for that device, and interleaved between the original video pointers V1-V5. The personal content may be text, video or other content as desired. By interleaving the personalized and original content pointers, the personalized content may be viewed concurrently with the original program content as additional or auxiliary content on the view screen in addition to the original program content. Also, some personal content may be the same for all or a specified group of subscribed user devices, and other personal content may be selected based on the user device receiving the content.

It may also be desirable to provide similar content to that described above for personalized content as non-personalized "additional content" or data to all subscribed users, such as sports scores, news, scoring events, player or team statistics, breaking new updates, time sensitive data, advertising data, and the like. The present disclosure allows for such additional content/data in a similar way to that shown for the personalized, but it would be sent to all subscribing user devices, not selective by device/user.

Figure 11:
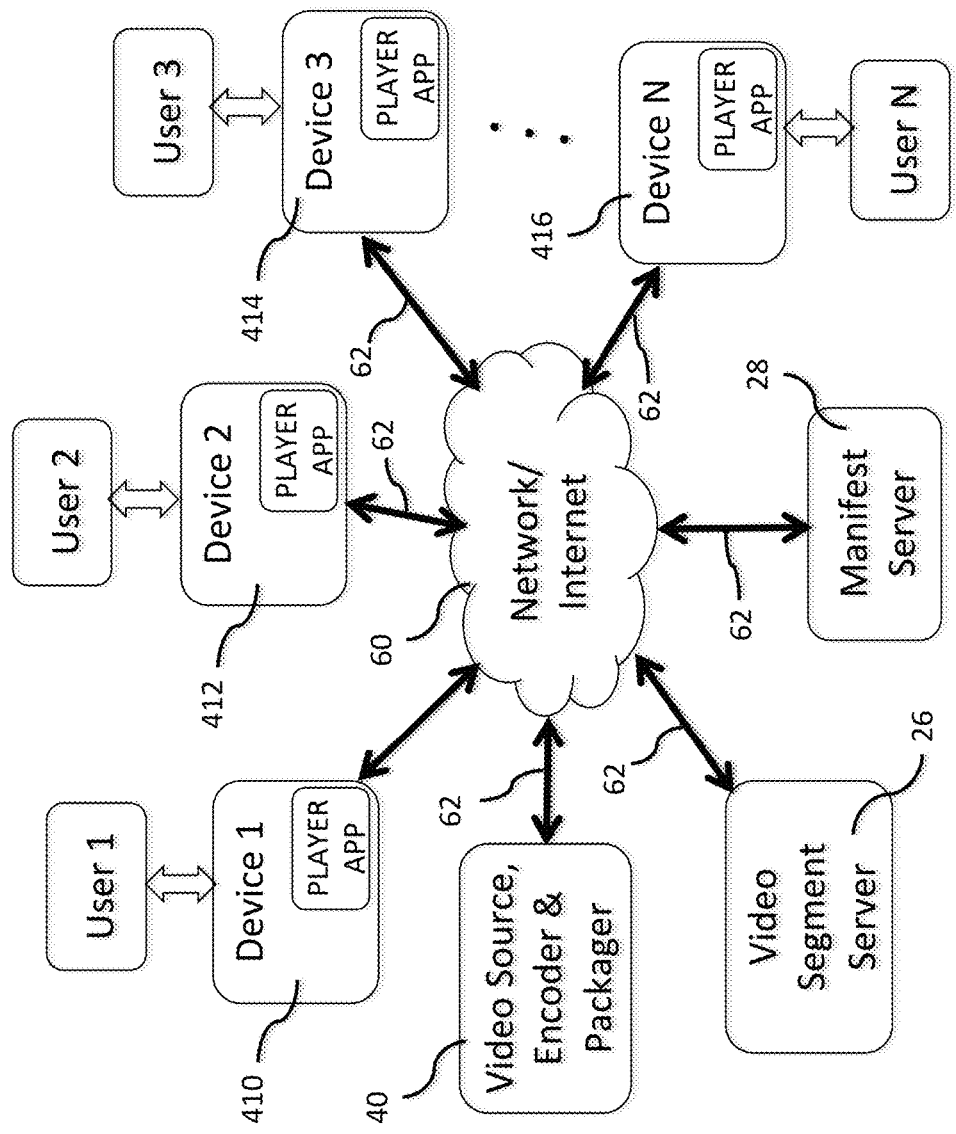
FIG. 11 is a block diagram of various components of a digital media streaming system connected via a network, in accordance with embodiments of the present disclosure

Referring to FIG. 11, the present disclosure may be implemented in a network environment. In particular, various components of an embodiment of the system of the present disclosure include a plurality of computer-based devices 410-416, which may interact with respective users (User 1 to User N). A given user may be associated with one or more of the devices 410-416. For example, a user may have a smartphone, a tablet, a smart TV, and a laptop, each of which may be playing a video desired to be viewed by the user at a given time. Each of the devices 410-416 may include a respective local (or host) operating system running on the computers of the respective devices 410-416. Each of the devices 410-416 may include a respective display screen that interacts with the operating system and any hardware or software applications, video and audio drivers, interfaces, and the like, needed to view and listen to the desired media content on the respective device. The users interact with the respective user devices 410-416 and may provide inputs to the devices 410-416 to start and stop the video at desired times and may input data content into the respective devices 410-416 to interact with the local device software applications.

Each of the user devices 410-416 may also include a local application software for playing the media content on the device (or "Player App"), which runs on, and interacts with, the respective operating system of the device, which may also receive inputs from the users, and provides audio and video content to the respective audio speakers/headphones and visual displays of the devices. In some embodiments, the Player App may reside on a remote server and communicate with the user device via the network.

Portions of the present disclosure may be implemented by adding software or logic to the user devices, such as adding to an existing player application software or installing a new/additional player application software, to perform the functions described herein, e.g., subscription request, opening persistent connection, and other functions described herein for the user devices 410-416. Similarly, other portions of the present disclosure may be implemented by software to the distribution system/media servers 38 or the video segment server 26 or the manifest server 28, or the processing system 36 to perform the functions described herein associated with the server and video processing portion of the system, such as managing the user device subscription list, sending push notices, and the like.

Also, the present disclosure may provide the user or viewer with two modes of operation when the user launches the Player App and presses play. One mode is when the user wants low latency, i.e., the user wants content to start playing sooner, even if it is not as fresh (where user is not concerned if the content is slightly old—average of half video chunk/segment time, as discussed above). The other mode is if the user wants the freshest possible content (as close to live as possible) when the content begins playing, where the user is willing to wait for the next push notification (on average half video chunk/segment time). In that case, when the user presses play, instead of seeing content immediately, the user may see a display message such as: "please standby waiting for content" or "loading." Either approach can be provided with the present disclosure. The user device Player App may provide a feature that allows the user to select between low latency and freshest video, which may be selected in the settings feature of the Player App software.

The user devices 410-416, may be connected to or communicate with each other through a communications network 60, such as a local area network (LAN), wide area network (WAN), virtual private network (VPN), peer-to-peer network, or the internet, wired or wireless, as indicated by lines 62, by sending and receiving digital data over the communications network 60. If the devices 410-416 are connected via a local or private or secured network, the devices 410-416 may have a separate network connection to the internet for use by the device web browsers. The devices 410-416 may also each have a web browser to connect to or communicate with the internet to obtain desired content in a standard client-server based configuration to obtain the Player App or other needed files to execute the logic of the present disclosure. The devices may also have local digital storage located in the device itself (or connected directly thereto, such as an external USB connected hard drive, thumb drive or the like) for storing data, images, audio/video, documents, and the like, which may be accessed by the Player App running on the user devices 410-416.

Also, the computer-based user devices 410-416 may also communicate with separate computer servers via the network 60 for the video segment server 26 and the manifest server 28. As discussed herein, the video segment server 26 and the manifest server 28 may have desired media or text files or other content stored on the server desired to be used by the devices 410-416. The servers 26,28 may be any type of computer server with the necessary software or hardware (including storage capability) for performing the functions described herein. Also, the servers 26,28 (or the functions performed thereby) may be located in a separate server on the network 60, or may be located, in whole or in part, within one (or more) of the devices 410-416 on the network 60. In addition, the video source 12, encoder 16, and packager 20, shown collectively as numeral 40, may also communicate via the network 60 to the video segment server 26 and the manifest server 28 to provide the desired media content for use by the devices 410-416.

Accordingly, the present disclosure maintains the simplicity and scalability of HTTP-based distribution for the media content (e.g., standard HTTP caching and distribution), and minimizes traffic on the "push" connection (which cannot be cached), and lowers the load on the push servers, thereby dramatically increasing the number of clients/users each manifest push server can support. It separates the high bandwidth video content delivery from the manifest content delivery and changes the approach of manifest management from a polling approach by the user devices, to a pushing (or interrupt driven) notification approach from the manifest server, thereby allowing all the user devices to have the same viewing experience.

Therefore, the disclosure reduces latency (half of the segment size on average) and eliminates polling, minimizes the amount of data used for manifest push transmissions (as only changes need to be sent, instead of a longer manifest/playlist), and reduces the overhead associated with current HTTP-based manifest updates, which constantly set-up and break-down HTTP request/connections. It also improves the consistency across clients by providing synchronization. Also, the present disclosure may be used with a live video stream, or video that is being played as if it were live.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for a user device to receive streaming encoded video content grouped into segment video files, comprising:
    establishing a low-bandwidth persistent manifest connection between the user device and a manifest server;
    receiving at the user device from the manifest server, a push notice that a next video segment file in a segment server is available for viewing, the push notice being received via the persistent manifest connection, wherein the push notice comprises a manifest pointer indicative of the next video segment file in the segment server;
    updating a user device local manifest file with the manifest pointer from the push notice;
    downloading to the user device, via a segment delivery connection between the user device and the segment server, separate from the persistent manifest connection, the next video segment file from the segment server, for playing on the user device;
    playing the next segment file on the user device; and
    wherein the user device does not receive any manifest file or playlist.

2. The method of claim 1, wherein at least a portion of the local manifest file is a copy of a source manifest file on the manifest server.

3. The method of claim 2, wherein the push notice is received by the user device after the source manifest file has been updated by the manifest server with the manifest pointer.

4. The method of claim 1, wherein the establishing step comprises sending a subscription request from the user device to the manifest server to receive push notices from the manifest server.

5. The method of claim 1, wherein the establishing step comprises sending, by the user device, identifying information about a user to the manifest server.

6. The method of claim 1, wherein the push notice comprises information indicative of characteristics of the new segment file.

7. The method of claim 1, wherein the push notice is indicative of at least one of: program video files, advertisement video files, personalized content, and additional content.

8. The method of claim 7, wherein the personalized content and the additional content each comprises content displayed concurrently with existing content being displayed by the user device.

9. The method of claim 1, further comprising repeating the establishment step when push notices have not been received after a predetermined time period.

10. The method of claim 1, wherein the manifest pointer is indicative of at least one of: the location of the next video segment file in the segment server and a second manifest file having information indicative of the next video segment file.

11. The method of claim 1 wherein the user device local manifest file comprises a top-level manifest file having pointers that point to at least one other manifest file having pointers indicative of the next video segment file.

12. The method of claim 1, wherein the manifest server and the segment server comprise different sections of the same server.

13. The method of claim 1, wherein the user device sends usage data to the manifest server via the persistent manifest connection.

14. The method of claim 1, further comprising, after the playing step, repeating all steps in the order shown, except for the establishing step, for each successive video segment file.

15. The method of claim 1, further comprising requesting a manifest pointer by the user device from the manifest server in response to receiving the push notice.

16. The method of claim 1, wherein the playing on the user device uses at least one of a "low latency" mode or a "freshest possible content" mode.

17. The method of claim 1, further comprising building a local manifest file within the user device using the manifest pointer from the push notice.

18. A method for streaming encoded video content grouped into segment video files to at least one user device, comprising:
    establishing a persistent low-bandwidth manifest connection between the at least one user device and a manifest server;
    sending to the user device from the manifest server, a push notice that a next video segment file in a segment server is available for viewing, the push notice being sent via the persistent manifest connection, wherein the push notice comprises a manifest pointer indicative of the next video segment file in the segment server;
    building a local manifest file within the user device using the manifest pointer from the push notice;
    downloading to the user device, via a segment delivery connection between the user device and the segment server, separate from the persistent manifest connection, the next video segment file from the segment server, for playing on the user device; and
    wherein the user device does not receive any manifest file or playlist.

19. The method of claim 18, further comprising updating a source manifest file by the manifest server with a manifest pointer prior to sending the push notice to the user device.

20. The method of claim 19, wherein the push notice is sent to the user device after the source manifest file has been updated with a pointer indicative of the next video segment file in the segment server.

21. The method of claim 19 wherein the source manifest file comprises a top-level manifest file having pointers that point to at least one other manifest file having pointers indicative of the next video segment file.

22. The method of claim 18, wherein the manifest pointer is indicative of at least one of: the location of the next video segment file in the segment server and a second manifest file having information indicative of the next video segment file.

23. The method of claim 18, wherein the establishing step comprises receiving at the manifest server a subscription request from the user device to send push notices from the manifest server to the user device.

24. The method of claim 18, wherein the establishing step comprises receiving at the manifest server, identifying information about a user from the user device.

25. The method of claim 18, wherein the push notice comprises information indicative of characteristics of the new segment file.

26. The method of claim 18, wherein the push notice is indicative of at least one of: program video files, advertisement video files, personalized content, and additional content.

27. The method of claim 26, wherein the personalized content and the additional content each comprises at least one of: sports scores, news, updates, advertisements, scoring events, and alerts.

28. The method of claim 26, wherein the personalized content and the additional content each comprises content displayed concurrently with existing content being displayed by the user device.

29. The method of claim 18, wherein the establishing step comprises receiving at the manifest server a subscription request from a plurality of user devices.

30. The method of claim 18, wherein the push notice is sent by the manifest server simultaneously to all user devices that have established the persistent manifest connection with the manifest server.

31. The method of claim 18, wherein the manifest server and the segment server comprise different sections of the same server.

32. The method of claim 18, wherein the manifest server receives usage data from the user device via the persistent manifest connection.

33. The method of claim 18, further comprising, after the downloading step, repeating all steps in the order shown for each successive video segment file.

34. The method of claim 18, wherein the low-bandwidth persistent manifest connection comprises at least one of: websockets, HTTP long polling, and plain TCP sockets.

35. The method of claim 18, wherein the playing on the user device uses at least one of a "low latency" mode or a "freshest possible content" mode.

* * * * *